United States Patent [19]

Downing et al.

[11] 3,885,005

[45] May 20, 1975

[54] PRODUCTION OF REFRACTORY ARTICLES BY A FREEZECAST PROCESS

[75] Inventors: Howard Leroy Downing; Ned Wright Roudabush, both of Cincinnati, Ohio

[73] Assignee: The Chas. Taylor's Sons Company, Cincinnati, Ohio

[22] Filed: Aug. 20, 1973

[21] Appl. No.: 389,465

[52] U.S. Cl. .................. 264/28; 264/65; 264/66; 264/125
[51] Int. Cl. ............................................ B29c 25/00
[58] Field of Search ............ 264/28, 64, 65, 66, 86; 106/69

[56] References Cited
UNITED STATES PATENTS
3,177,161  4/1965  Johannsen .......................... 106/69
3,512,571  5/1970  Phelps ................................ 264/28

Primary Examiner—Donald J. Arnold
Assistant Examiner—John Parrish

[57] ABSTRACT

Refractory articles are produced by a freezecast process which comprises forming a flowable aqueous slurry of a refractory composition and a colloidal silica sol, adding said slurry to a machined non-porous mold, freezing said slurry in said mold to form a bonded refractory product, removing the frozen bonded refractory product from said mold to form a frozen finished green refractory shape, subjecting the frozen material to an elevated temperature to thaw the ice and to dry the water from said material in order to prevent the water from reacting with the surface of the refractory body, thereby preventing the water from harming the finished dimensions of the precision shaped body and firing said dried material at a temperature from 2,000° to 3,500°F to form said refractory article.

The particles in said refractory compositions should be coarse in size, i.e., at least 70 percent of said particles being +200 mesh up to one-half inch in size. The final refractory article produces has a porpsity of less than 25 percent with a modulus of rupture of at least 1,200 psi.

1 Claim, No Drawings

PRODUCTION OF REFRACTORY ARTICLES BY A FREEZECAST PROCESS

BACKGROUND OF THE INVENTION

Refractory articles of various shapes and compositions have been prepared by many methods including slip casting in which a ceramic composition is formed into a slip which is added to a plaster mold. The water is removed to form a fragile green refractory shape. The molded article is fired to form the finished refractory article. In such methods the shapes of the articles produced must be relatively simple and not complex in their configurations because the green slip cast article is fragile and therefore difficult to handle.

When ceramic articles are to be produced which have more complex shapes such as deep undercuts, high relief and sharply defined details in the surface patterns, gel casting processes are resorted to instead of slip casting methods.

In such processes the rate of production is reduced considerably since great care and time are required to produce the proper gellation necessary to produce a satisfactory molded green article.

Ceramic shell molds for foundry metal casting made by freezecasting processes have also been described by the prior art. These ceramic shell molds, however, possess properties having a low density, high porosity and high permeability since these ceramic shells are fired only at temperatures from 1,200° to 1,800°F to remove the water hydration, and therefore they are expendable and are easily cracked.

The rapid freezecast process as described in the instant invention in contrast to the prior art methods produces finished green castings having great strength after thawing and drying. When they are fired at 2,000° to 3,500°F, they are highly sintered and have high density and low porosity. They also have substantially increased thermal shock resistance and high moldulus of rupture.

SUMMARY OF THE INVENTION

Finished fired refractory articles of manufacture are produced by the instant process which comprises admixing relatively coarse particles of a refractory composition, a silica sol and water to form a flowable slurry, adding said slurry to a machined nonporous pair of complementary mold pieces, freezing said slurry in said mold to a solid shape and to form a bonded refractory product, removing the frozen bonded product from said mold, subjecting the frozen material to an elevated temperature to thaw the ice and to dry the water from said material in order to prevent the water from reacting with the surface of the refractory body, thereby preventing the water from harming the finished dimensions of the precision shaped body and firing said dried material at a temperature from 2,000° to 3,500°F to form said refractory article.

DESCRIPTION OF THE PREFERRED EMBODIMENTS

In order to produce refractory products which possess high density and low porosity using a freezecast process, it is necessary to employ refractory powders as starting materials which possess particles having relatively coarse sizes. It has been found that at least 70 percent of the refractory particles should be greater than 200 mesh and up to one-half inch mesh size. The refractory materials used in the instant invention may be any well known ceramic mixtures which may include among others zircon, silica, mullite, alumina, kyanite, carbomul, spinels and the like. These particular refractory particles are blended with an aqueous colloidal silica sol and water if necessary to form a flowable slurry. The amount of colloidal silica sol used is from 5 to 20 percent by weight of the refractory mixture which preferably contains from 30 to 50% $SiO_2$. The mixed slurry should contain from 85 to 95 percent solids. This slurry will remain stable at room temperature.

This slurry is then fed into a pressure tank where a vacuum is employed to remove the entrapped air. It has been found for example, that a vacuum of 29.9 in. Hg over a period of 15–30 minutes is satisfactory to remove the air.

In order to reproduce a finished green refractory shape which upon firing needs little or no machining, a precision non-porous pair of complementary mold pieces are used as the die mold for preparing the shape.

The slurry prepared above is then preferably bottom fed by pressure into the die cavity formed by the complementary mold pieces until the cavity is completely filled. A convenient pressure used to fill the cavity has been found to be from 30 to 150 psi.

After filling the die cavity, the die is then subjected to refrigeration in order to freeze the slurry present in the die cavity.

As the temperature of the slurry is lowered to about 15°F, the colloidal silica sol forms a irreversible precipitation and forms a bond of great strength with the refractory particles. The silica bonded refractory particles are then further frozen until a temperature as low as −80°F for example is obtained.

The refrigeration is then terminated, the complementary mold pieces are separated and the frozen refractory shape is removed from the die. The refractory shape is easily removed from the mold pieces since the surfaces of refractory die castings contains a thin layer of ice on its outer surface and because the mold has a polished or finished surface. Push pins may be used to aid in the ejection if desired.

The frozen refractory product produced at this stage possesses high green strength. In addition it has finished dimensions and therefore, will need little or no machining after firing.

While the refractory shape is still frozen, it is then heated to thaw the ice and to drive out the water and then it is fired at temperatures from 2,000° to 3,500°F to sinter the product.

Refractory compositions prepared by the above process are superior in properties to their slip cast counterparts.

These fired refractory products have low porosity, increased density, and substantial increase in thermal shock resistance. The porosity in below 25 percent, the density is above 2.0 g/cc and the modulus of rupture is at least 1,200 psi. The dimensional tolerances from one piece to another are nominally about ±0.005 in/in., while their slip cast counterparts are about 0.02 in/in.

Since these refractory bodies are less porous and more dense, their resistance to glass, metal and slag corrosion is superior to the slip cast equivalents.

In addition to the above advantages, the refractory products made by the above described process are cast to finished dimensions and have well filled, strong corners and edges.

In order to describe the instant invention in more detail, the following examples are presented:

EXAMPLE 1

The refractory composition used in this example contained the following ingredients:

| INGREDIENT | PERCENT |
| --- | --- |
| Synthetic mullite ($3Al_2O_3 \cdot 2 SiO_2$) | 35% |
| Alumina ($Al_2O_3$) | 65% |
| Silica sol (added to above mixture) | 15% |

The refractory composition contained particles having the following size distribution:

| MESH SIZE | PERCENT |
| --- | --- |
| −200 | 30% |
| +200 −60 | 20% |
| +60 −20 | 20% |
| +20 −½ inch | 30% |

100 parts of the refractory composition are then mixed with a silica sol to form a slurry containing 15 percent silica sol by weight which contains 35 percent silica. The slurry was then fed into a pressure tank having a vacuum of 29.9 in. Hg and was held under the vacuum for 15 minutes to remove the entrapped air.

This slurry was then bottom fed into a die cavity formed by complementary mold pieces using a pressure of 60 psi until the die cavity was filled. The slurry was then refrigerated with freon until the temperature dropped to −60°F. During the refrigeration cycle, the silica sol formed an irreversible gel at about 15°F which formed a bond of great strength with the refractory particles. After the bonded refractory-silica mixture reached a temperature of −60°F, the frozen shape was removed readily from the complementary mold pieces.

While still frozen the refractory shape was then placed in an oven at 200°C to thaw the ice and remove the water over a period of 4 hours. After drying, the article was then fired to 2,560°F and held at this temperature for 5 hours to sinter the article.

The fired finished article had the following properties:

| PROPERTIES | |
| --- | --- |
| Density gm/cc | 2.6 |
| Porosity % | 20.1 |
| Green Strength lb/in² | 110* |
| Fired Final Strength lb/in² | 1900–2300 |

*This green strength is greatly improved over the green strength of a slip cast article.

EXAMPLES 2 – 4

In these examples the procedure of Example 1 was repeated except that the other refractory compositions were used as follows:

| EXAMPLE 2 COMPOSITION: | |
| --- | --- |
| INGREDIENTS | PERCENT |
| American Kyanite ($Al_2O_3 \cdot SiO_2$) | 30% |
| Carbomul (fused $Al_2O_3 \cdot ZrO_2 \cdot SiO_2$) | 50% |
| Alumina ($Al_2O_3$) | 20% |
| Silica Sol (added to above mixture) | 20% |

| EXAMPLE 3 COMPOSITION | |
| --- | --- |
| INGREDIENTS | PERCENT |
| Zircon ($ZrO_2 \cdot SiO_2$) | 100% |
| Silica Sol (added to above mixture) | 15 % |

| EXAMPLE 4 COMPOSITION | |
| --- | --- |
| INGREDIENTS | PERCENT |
| Zircon ($ZrO_2 \cdot SiO_2$) | 35% |
| Alumina ($Al_2O_3$) | 65% |
| Silica Sol (added to above mixture) | 15% |

The operational details and results obtained are recorded in the following table along with those of Example 1.

In all of the these examples, the refractory compositions produced possessed great strength, low porosity and high density.

Refractory articles having tubular shafts may also be prepared by this method. In order to form these refractory shaped articles, it is desirable to employ a plastic composition having low conductivity, such as acrylics, teflon, polyolefins, and the like, for the internal die member which forms the bore, core or shaft of the tubular article. In forming the tubular article, the same type of slurry is poured between the outer die member and the inner die member.

The outer die member preferably should be constructed of a nonporous metal which is precision cut while the inner die member should be made of the plastic composition.

The refractory colloidal silica slurry present in the cavity is then refrigerated to form an irreversible gel which forms the strongly bonded refractory-silica product. During the freezing operation the freezing of the tube or other shaped body occurs through the outside metal mold into the refractory composition and toward the plastic core. Since the plastic core is the last part of the mold to be subjected to the refrigeration, the plastic core contracts or shrinks away from the refractory wall. This shrinkage is obtained since the plastic composition has a lower conductivity than the outside metal mold. Because the plastic core has this shrinkage characteristic, it becomes possible to produce straight, non-tapered tubular walls to be formed which are extremely difficult to produce without using expensive procedures for producing the same.

The following example is presented to show the preparation of a tube having an internal diameter of 10 inches and a length of 25 inches.

EXAMPLE 5

Using the procedure described in Example 1 a similar slurry of the refractory material and the silica sol were added to a tube mold of size similar to the tube described above. The outside die was made of non-porous metal and the central die forming the core was made of an acrylic plastic composition. The slurry was then refrigerated from this outside toward the center core. Again an irreversible gel formed at 15°F and formed a strongly bonded refractory-silica composition. The center wall of the tube was frozen last. During the refrigeration the plastic composition began to shrink away from the center wall of the tube as the tube became frozen since the conductivity is lower than the refractory material.

The frozen molded tube was then removed from the die molds and the tube was dried to thaw the ice and remove the water and it was then fired in the same manner as that described in Example 1. The fired tube had the following properties:

| | |
|---|---|
| Density (gm/cc) (ASTM C 20–46) | 2.6–2.7 |
| Porosity (%) (ASTM C 20–46) | 19–22 |
| Strength (psi) (ASTM C 135–55) | 2000–2300 |

TABLE

| REFRACTORY COMPOSITION | EXAMPLES | | | | |
|---|---|---|---|---|---|
| | 1 | 2 | 3 | 4 | 5 |
| Tabular Alumina (%) | 65% | 20% | — | 65% | 20% |
| Fused Alumina-Zirconia-Silicate (%) | — | — | — | — | 50% |
| Kyanite (%) | — | 30% | — | — | 30% |
| Mullite (%) | 35% | 50% | — | — | — |
| Dense Zircon (%) | — | — | 100% | 35% | — |
| Colloidal Silica Sol (50% SiO₂) (%) (added to mixture) | — | — | 15% | 16% | 20% |
| Colloidal Silica Sol (35% SiO₂) (%) (added to mixture) | 15% | 15% | — | — | — |
| PARTICLE SIZE | EXAMPLES | | | | |
| | 1 | 2 | 3 | 4 | 5 |
| –½ inch mesh +20 mesh (%) | 30% | 30% | 15% | 20% | 30% |
| –20 mesh +60 mesh (%) | 20% | 20% | 5% | 10% | 20% |
| –60 mesh +200 mesh (%) | 20% | 20% | 50% | 50% | 20% |
| –200 mesh (%) | 30% | 30% | 30% | 30% | 30% |
| Amount of Refractory Composition (lbs) | 100 | 100 | 100 | 100 | 100 |
| Amount of Colloidal Silica Soln. (lbs) | 15 | 15 | 15 | 16 | 20 |
| SiO₂ in Soln (%) | 35 | 35 | 50 | 50 | 50 |
| Temperature of Firing (°F) | 2650 | 2650 | 2800 | 2800 | 2650 |
| Properties of Fired Refractory | | | | | |
| Density (gm/cc) (ASTM C 20–46) | 2.5–2.6 | 2.4–2.5 | 3.3–3.4 | 3.0–3.2 | 2.6–2.7 |
| Porosity (%) (ASTM C 20–46) | 20–24 | 21–23 | 19–21 | 20–22 | 19–22 |
| M/R Strength (lb/in²) or (psi) (ASTM C 135–55) | 1900–2300 | 3600–3900 | 2000–2200 | 1300–1600 | 2000–2300 |

From the above description and by the examples presented it has been shown that superior products have been made by the instant process. The refractory products prepared by the instant invention have substantially finished dimensions and have wellfilled strong corners and edges. These refractory products are less porous and more dense than their slip cast counterparts. They are also more resistant to glass, metal and slag corrosion.

The refractory products of the instant invention have porosities below 25 percent, densities above 2.0 g/cc and modulus of rupture strengths above 1,200 psi.

While this invention has been described and illustrated by the examples shown, it is not intended to be strictly limited thereto, and other variations and modifications may be employed within the scope of the following claims.

What is claimed is:

1. A method for preparing a precision shaped refractory body having finished dimensions, said refractory body being selected from the group consisting of metal oxide and metal silicates, which comprises selecting a refractory composition in which at least 70 percent of the particles in said composition are of size greater than 200 mesh up to one-half inch, adding to said composition a colloidal silica sol to form an aqueous slurry, said slurry containing from 85 to 95 percent solids and said sol containing from 5 to 20 percent silica, feeding said slurry into the die cavity of a pair of precision, nonporous complimentary mold pieces, refrigerating said slurry in said die cavity to a temperature below 15°F., to form an irreversible precipitation of the colloidal silica sol between the refractory particles, thus forming a bond of great strength, then freezing the entire refractory body, removing said frozen body from said die, subjecting the frozen body to an elevated temperature to thaw the ice and to dry the water from said material before the water reacts with the surface of the refractory body, thereby preventing the water from harming the finished dimensions of the precision shaped body and firing said dried material at a temperature from 2,000° to 3,500°F. to form a refractory body having a porosity of less than 25 percent, a density above 2.0 g/cc, and a modulus of rupture above 1,200 psi, and having a substantially increased thermal shock resistance, said refractory body being precision shaped and having finished dimensions.

* * * * *

UNITED STATES PATENT OFFICE
CERTIFICATE OF CORRECTION

Patent No. . 3,885,005     Dated May 20, 1975

Inventor(s) Howard Leroy Downing; Ned Wright Roudabush

It is certified that error appears in the above-identified patent and that said Letters Patent are hereby corrected as shown below:

In Claim 1 - Column 6 - Line 9

"5 to 20" changed to - 30 to 50 -

Signed and Sealed this sixteenth Day of December 1975

[SEAL]

Attest:

RUTH C. MASON
*Attesting Officer*

C. MARSHALL DANN
*Commissioner of Patents and Trademarks*